Oct. 18, 1927.

H. B. STANSBURY 1,645,826

PNEUMATIC CHASSIS SUPPORT

Filed Sept. 12, 1925

Inventor:
Harry B. Stansbury,
by Dippey Hoagland
His Attorneys.

Patented Oct. 18, 1927.

1,645,826

UNITED STATES PATENT OFFICE.

HARRY B. STANSBURY, OF ST. LOUIS, MISSOURI.

PNEUMATIC CHASSIS SUPPORT.

Application filed September 12, 1925. Serial No. 55,986.

This invention relates to a pneumatic chassis support.

An object of the invention is to provide an improved chassis support comprising combined pneumatic and spring devices for supporting the chassis from the axle of the vehicle, and in which the pneumatic devices are cooperatively connected with the springs.

Another object of the invention is to provide a chassis support having springs connected at one end to the vehicle axle housing and connected at the opposite end with pneumatic devices in connection with the chassis, so that when the vehicle is traveling over uneven surfaces combined action of the springs and the pneumatic devices prevent the shocks from affecting the vehicle.

Another object of the invention is to provide means for equalizing the action of the device at opposite sides of the vehicle.

Figure 1:
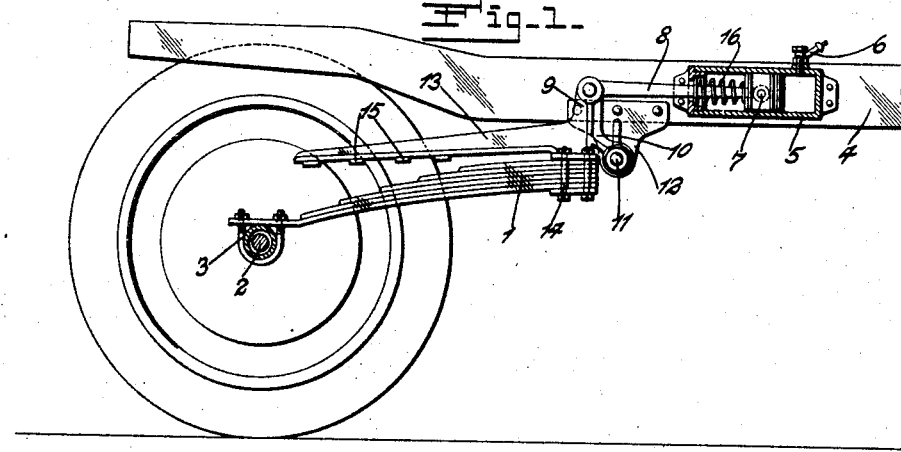

Other objects will appear from the following description, reference being made to the accompanying drawing, in which Fig. 1 is a side elevation of the invention with the pneumatic cylinder shown in section.

Figure 2:
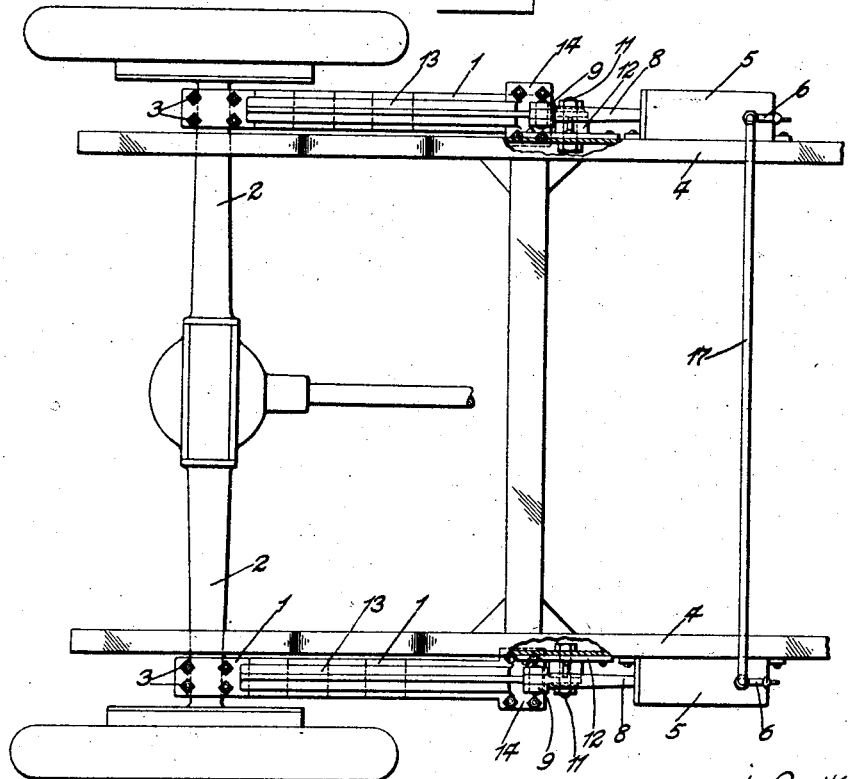

Fig. 2 is a plan view of the invention including a pipe connection between the cylinders at opposite sides of the vehicle, which is not included in the form of the invention shown in Fig. 1.

The spring 1 is composed of a number of superimposed leaves of different lengths, thus providing a spring structure which is relatively thick at one end and relatively thin at the opposite end. The thin end of the spring structure is attached to the housing 2 of the vehicle by a fastener 3 leaving the thick end of the spring free for connection with the pneumatic devices. To each side member 4 of the chassis a pneumatic cylinder 5 is attached.

These cylinders 5 may be out of communication with each other, in which case each of said cylinders is equipped with an air valve 6 of familiar construction for connection with the chuck of an air hose, thus providing means for forcing air into the cylinders to any desired degree of pressure. Each cylinder 5 contains a reciprocating piston 7 having pivotal connection with a connecting rod 8 extending through and beyond the end of the cylinder that is toward the axle with which the spring is connected. The outer end of the connecting rod 8 is pivoted to an arm 9 of a bell crank lever having a projecting arm 10 mounted on a pivot 11 in a bracket 12 attached to and depending from the chassis side member 4. The opposite arm 13 of the bell crank lever has rigid connection 14 with the thick end of the spring, leaving the arm 13 of the lever extending over, but normally out of contact with the spring. The spring is curved upwardly from the connection with the axle to the connection with the bell crank lever. The under side of the arm 13 of the bell crank lever is provided with a number of bumper blocks 15 possessing greater elasticity than the metal and designed and adapted to contact with the upper surfaces of the leaf springs, respectively, to receive the impact of the greater shocks.

Each of the cylinders 5 contains a spring 16 interposed between the end of the cylinder wall and the adjacent end of the piston and opposing movement of the piston toward the end of the cylinder through which the connecting rod 8 extends. This spring cooperates with the remaining elements to absorb the rebound and to control the action.

The invention shown in Fig. 2 is the same as that described, with the additional provision of a pipe or tube 17 connecting and opening into the air cylinders 5 at opposite sides of the vehicle to provide equalizing means.

From the foregoing it will be seen that my invention obtains all of its intended objects and purposes very efficient and satisfactorily; may be manufactured and installed economically either as a part of the original vehicle equipment, or in substitution of the usual springs. The structure and its connection with the vehicle may be varied in numerous particulars without departure from the nature and principle of the invention. I do not restrict myself in any unessential particulars, but what I claim and desire to secure by Letters Patent is:—

1. A chassis support comprising springs attached to and extending approximately at right angles forwardly from the axle housing, a pair of levers pivotally connected to the chassis in front of the front ends of said springs and arranged to contact with said springs in certain operations of the vehicle, means connecting the springs and the levers respectively adjacent to the pivotal connections of said levers with the chassis, an arm extending upwardly from each lever above the front end of the corresponding spring, a horizontal cylinder attached to each side of the chassis, a piston horizontally operative in each cylinder, and a connecting rod from each piston to the corresponding lever arm.

2. A chassis support comprising springs attached to and extending approximately at right angles from the axle housing, a lever attached to the outer end of each spring, means pivotally connecting each lever with the vehicle chassis and constituting the only connection between said spring and the chassis, a cylinder in connection with each side of the vehicle chassis, a piston in each cylinder, a connection from each piston to said lever, and bumper elements on said lever arranged to contact with said spring.

3. A chassis support comprising springs each having one end attached to an axle housing and having its opposite end at a distance from the axle housing, levers pivotally connected with the vehicle chassis and having arms extending over said springs respectively to limit downward movement of the chassis, and a pneumatic connection between each of said levers and the chassis.

4. A chassis support comprising springs each having one end attached to an axle housing and having its opposite end at a distance from the axle housing, levers pivotally connected with the vehicle chassis and having arms extending over said springs respectively and constituting the only connection between said spring and the chassis, a pneumatic connection between each of said levers and the chassis, and bumper blocks attached to said lever and arranged to contact with said springs.

HARRY B. STANSBURY.